H. W. TAYLOR.
CASTER.
APPLICATION FILED MAY 28, 1907.
992,290.
Patented May 16, 1911.
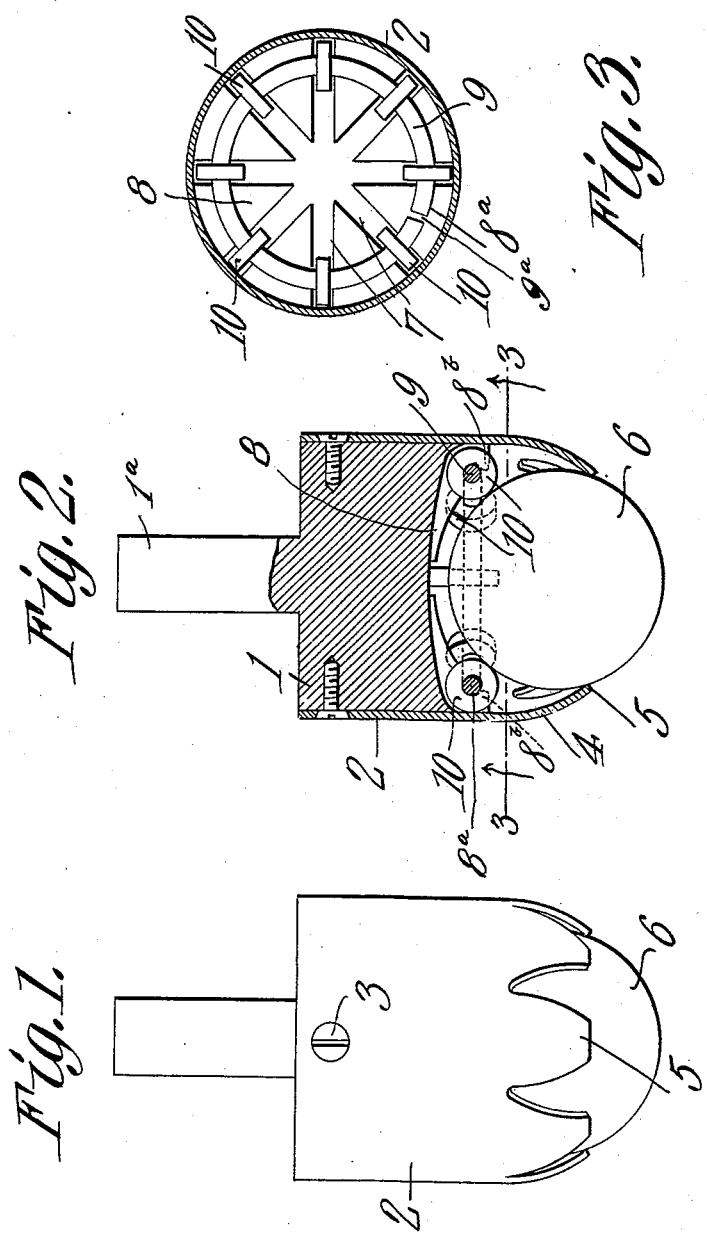
Henry W. Taylor,
INVENTOR
WITNESSES:
By C.A.Snow & Co.
ATTORNEYS

UNITED STATES PATENT OFFICE.

HENRY WM. TAYLOR, OF CORSICANA, TEXAS.

CASTER.

992,290.  Specification of Letters Patent.  Patented May 16, 1911.

Application filed May 28, 1907. Serial No. 376,126.

*To all whom it may concern:*

Be it known that I, HENRY W. TAYLOR, a citizen of the United States, residing at Corsicana, in the county of Navarro and State of Texas, have invented a new and useful Caster, of which the following is a specification.

This invention relates to casters, and more especially to those of that type employing a ball and anti-friction rollers; and the object of the same is to produce a caster of this kind wherein the rollers are supported out of bearing contact with anything but the ball and are carried by a spring ring so that they are removable bodily from the caster and individually from the ring and yet when in place they are held by the expansion of the ring rather than by the ball. Casters of this general type have been made heretofore, some of them even employing a split ring for carrying the rollers, and the distinguishing characteristic of my improvement lies in the fact that the horizontal expansion of the ring seats it laterally in its retaining groove rather than vertically and thus holds the rollers in place even though the ball should pass out of contact with them temporarily or permanently. It often happens that the ball sticks and becomes worn or flattened on one side, and if later that flattened side turns uppermost it is obvious that it will permit the balls to fall unless they have a support of their own. It always happens that where a caster of this type is moved and the ball revolves in one plane it causes the rotation of those rollers whose axes are at substantially right angles to such plane but it slips against the wear faces of the remaining rollers and hence tends to dislodge them from position or to move them along on their supporting ring, and this I avoid by seating each roller in an individual radial groove which is only of sufficient width to allow the roller to rotate on the ring.

While my invention accomplishes the same end heretofore attained by devices of a similar character, I consider it an improvement over them as to these details which are described in the following specification and shown in the drawings wherein—

Figure 1 is a side elevation of the caster complete, Fig. 2 is a vertical sectional view with parts in elevation, and Fig. 3 is a horizontal section on the line 3—3 of Fig. 2 looking upward.

In the said drawings the numeral 1 designates the body or head, here shown as a solid metallic member with a shank 1$^a$ rising from it for insertion into the leg of the piece of furniture to which the caster is attached, although the form of attachment of the body to the leg forms no part of the present invention.

6 designates the ball, and 2 the retainer, the latter here being a cylindrical member secured to the body as by screws 3 and having inturned fingers 5 at its lower end which bear on the ball below its center and allow it to rotate. Between the body and the ball is a series of anti-friction rollers 10 mounted on a spring ring 9 which is split as at 9$^a$, and this ring has an expansive tendency so that said split would normally open to permit the rollers to be strung onto the ring or be removed therefrom as for replacement or repair. The parts thus far described are all well known in the art, and my present invention consists in the specific means for mounting this ring within the body.

Formed in the lower face of the body are diametrical grooves 7 (four being shown in the drawings) intersecting at the center, and these grooves are shallow beneath the center of the body and grow deeper toward their outer ends so that between them there are produced sectors or projections 8 each substantially triangular when viewed from below and all of them dished on their lower faces so that the body with its projections has a concaved lower end which is of larger size than the upper side of the ball 6. Each groove is of sufficient width to loosely accommodate a roller 10, and at its outer end is of sufficient depth to accommodate the ring 9 and the rollers 10 so that the latter shall be held out of bearing contact with the head or the retainer but their inner sides shall project beyond the dished faces of the sectors and into contact with the ball. Into the dished faces of said sectors and on a true circle around the center is cut an annular groove 8$^a$ which opens radially inward toward the axis of the caster and which intersects the grooves 7 where it crosses them, and the position of this groove and the direction in which it is cut I consider highly important to the present invention. As best seen in Fig. 2, the cutting of the groove horizontally into the sectors near their outer ends produces a curved flange 8$^b$ in each sector which projects inward partly beneath the groove, and the latter is of a size to closely receive the spring ring 9 and of such location that when the ring is in place the rollers 10 will have no bearing contact with the body 1 at the bottoms of the grooves 7 nor with the inner face of the retainer 2 but their lower and inner sides will project beyond the sectors and contact with the upper side of the ball 6.

In assembling the parts of this improved caster, the rollers are strung on the ring, the latter compressed until its split 9$^a$ is practically closed, the ring and rollers are then inserted upward into the body 1, and the ring in this condition is sufficiently small to pass the flanges 8$^b$. When pressure is released from the ring, it springs horizontally outward and fits snugly into the groove 8$^a$, and thereafter the ball is put in place, and finally the retainer. The caster is then applied to the piece of furniture, and when the latter is moved over the floor it is obvious that the ball will rotate in one direction and those rollers whose axes are at substantially right angles to the line of movement will rotate in the opposite direction, their inner faces having bearing contact with the ball and their sides merely touching the side walls of the grooves 7 which hold the rollers spaced from each other, but the rollers themselves having no further contact with anything. Meanwhile as the caster moves and the ball rotates, its upper side must of course slip over the faces of those rollers whose axes stand substantially parallel with the line of movement, but the fact that the grooves 7 have parallel walls prevents such rollers from being slipped along on the ring. The latter is preferably of steel wire and of a size and strength to withstand the strain thus thrown upon it.

It may happen in time that the ball becomes worn and needs replacement. This is effected by removing the retainer 2 and the ball, but the fact that the ring springs horizontally outward prevents the series of rollers from dropping out of place because the flanges 8$^b$ extend a slight distance under the ring as shown. If however the ring or the rollers should be worn and need replacement, it is only necessary to compress the ring slightly and remove it, then allow it to expand, and then slip off and replace such rollers as may be worn; after which the parts can be reassembled in the manner above described.

What is claimed as new is:

The herein described caster, the same comprising a ball, a retainer therefor, a body having in its lower end a series of curved diametric grooves growing deeper from the center radially outward and each provided with parallel walls, the grooves forming between them a series of sectors and having in the lower face an annular groove extending horizontally outward from the axis of the body so as to produce a flange projecting inwardly beneath the groove, a normally expansible split ring sprung into said annular groove, and a series of anti-friction rollers journaled on the ring and each in bearing contact with the upper side of the ball only and mounted within its individual radial groove.

In testimony that I claim the foregoing as my own, I have hereto affixed my signature in the presence of two witnesses.

HENRY WM. TAYLOR.

Witnesses:
J. S. SIMKINS,
WM. L. ALBRIGHT.

---

Copies of this patent may be obtained for five cents each, by addressing the "Commissioner of Patents, Washington, D. C."